UNITED STATES PATENT OFFICE.

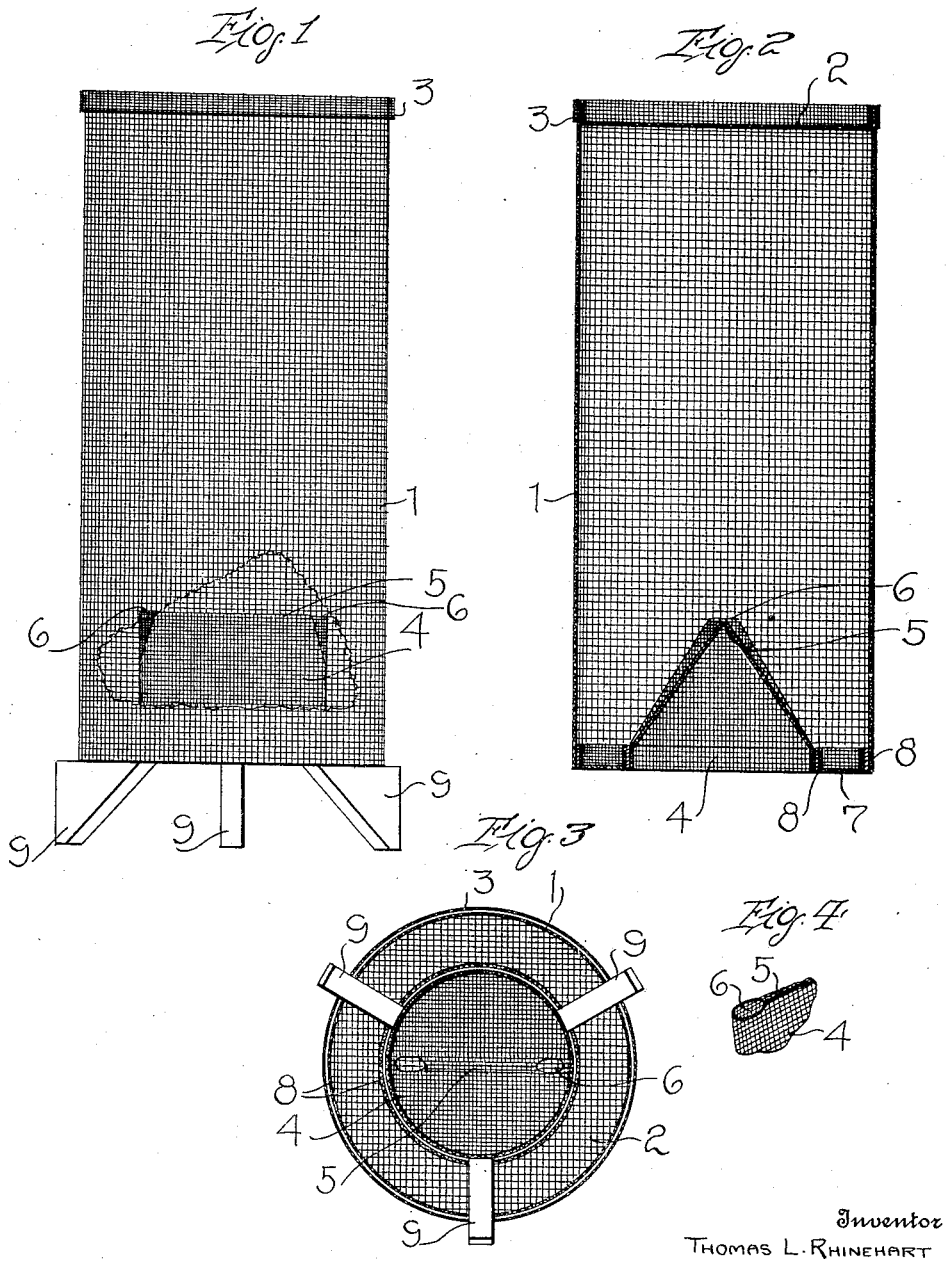

THOMAS L. RHINEHART, OF LEADVILLE, COLORADO.

INSECT-TRAP.

1,111,237. Specification of Letters Patent. Patented Sept. 22, 1914.

Application filed November 22, 1913. Serial No. 802,564.

*To all whom it may concern:*

Be it known that I, THOMAS L. RHINEHART, a citizen of the United States, residing at Leadville, in the county of Lake and State of Colorado, have invented certain new and useful Improvements in Insect-Traps, of which the following is a specification, reference being had to the accompanying drawings.

This invention relates to new and useful improvements in insect traps and more particularly to a trap which is especially adapted for use in catching and trapping flies and other insects of a similar character, the object of the invention is the provision of a trap of the above character which includes a suitable sized body member formed of screen wire or other desirable material and having at its lower end an upwardly projecting substantially pyramidal member, the top of which is elongated in form and at each end of the top are suitable openings forming entrances to the interior of the body for the insects.

Another object of the invention is the provision of a trap of the above character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a side elevation, parts thereof being broken away to illustrate the interior thereof; Fig. 2 is a vertical sectional view; Fig. 3 is a bottom plan view; and Fig. 4 is a detail perspective view of one corner of the inside member illustrating the construction of the same.

In carrying out my invention, I construct a cylindrical body 1 of a substantial mesh of screen wire and as illustrated in the drawings, the wire forms the cylindrical body 1 but it will be understood that the wire may be formed into any other desired shape. The main body 1 in the construction thereof is open at both ends and in forming the trap, the upper end thereof is closed by means of a suitable cover 2, the outer edge of which is bent upon itself to form a channel member 3 adapted to be engaged over the upper end of the body and to be secured in position in any desired manner. It will be noted from the showing in Fig. 2 that the cover member 2 is disposed below the upper edge of the body 1.

Arranged within the lower end of the body member 1 is an inverted member which is substantially pyramidal in form and is to be constructed of a suitable mesh wire, preferably finer than that which forms the body 1. The inverted pyramidal member 4 is substantially elongated and the medial portion at the upper end thereof is closed, as shown at 5, whereby to form at each end of the upper elongated portion the oval shaped openings 6 which form an entrance for the insects to the interior of the body. From this it will be seen that the insects may readily enter the body up through the inverted member 4 and through the openings 6. It will be understood that the openings will be of sufficient size to permit the insects to pass through the same and as it is a well known fact that flies and other insects of this character seldom travel downward, it will be seen that the insects will be readily entrapped within the body 1.

The inverted pyramidal member 4 is retained in position in the bottom of the body by means of the circular member 7 which is arranged between the body of the member 4 and the inner wall of the body 1, said circular member having upturned annular flanges 8 and 8', the flanges 8 being secured in any suitable manner to the wall of the body 1, while the flanges 8' are secured in a similar manner to the lower or larger end of the member 4. The body 1 is preferably supported upon the brackets 9, said brackets being arranged upon any suitable standard so that the bottom of the trap will be spaced from the support to permit of the ready entrance of the insects through the inverted pyramidal member 4.

From the above description taken in connection with the accompanying drawings, it will be readily apparent that I have provided a simple and durable insect trap whereby the flies and similar insects may be readily entrapped and retained until it is desired to empty the same. In the accompanying drawings, I have illustrated the top member 2 as removably mounted upon the upper end of the body so that it may be quickly and readily removed to empty the contents of the trap. It will be understood that while I have shown and described my improved trap as constructed of suitable wire mesh, it will be readily apparent that the same may be formed of any desired material. The device as herein shown and described is extremely simple in construction and can be manufactured at comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

A device of the class described including a cylindrical body, a removable cover at the upper end thereof, an inverted pyramidal shaped member arranged within the lower end and elongated in cross section, the medial portion of said pyramidal member being closed at its upper end to form entrance openings at each end thereof and a removable ring arranged between the lower end of said pyramidal member and the wall of the body, said ring having upturned flanges secured to the body and to the pyramidal member to retain said pyramidal member in position.

In testimony whereof I hereunto affix my signature in the presence of two witnesses.

THOMAS L. RHINEHART.

Witnesses:
T. A. GOLDNER,
W. G. HARRINGTON.

---

Copies of this patent may be obtained for five cents each, by addressing the " Commissioner of Patents, Washington, D. C."